(12) United States Patent
Hayashi et al.

(10) Patent No.: US 6,998,731 B2
(45) Date of Patent: Feb. 14, 2006

(54) ELECTRONIC AUTOMOTIVE ANTI-THEFT DEVICE

(75) Inventors: Masaki Hayashi, Aichi (JP); Masaki Yoshino, Aichi (JP); Toshihiro Nagae, Aichi (JP); Shinji Kishida, Toyota (JP); Koji Iwamoto, Toyota (JP); Toshio Asahi, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 563 days.

(21) Appl. No.: 10/223,477

(22) Filed: Aug. 19, 2002

(65) Prior Publication Data

US 2003/0071520 A1   Apr. 17, 2003

(30) Foreign Application Priority Data

Aug. 24, 2001   (JP) .............................. 2001-253902

(51) Int. Cl.
*B60R 25/02*   (2006.01)

(52) U.S. Cl. ....................................... 307/10.2; 70/252

(58) Field of Classification Search .................. 70/252; 307/10.2

See application file for complete search history.

(56) References Cited

U.S. PATENT DOCUMENTS

| | | | | |
|---|---|---|---|---|
| 4,839,532 A | * | 6/1989 | Kokuryo et al. ........... | 307/10.3 |
| 5,343,077 A | * | 8/1994 | Yoshida et al. ............ | 340/5.64 |
| 5,481,253 A | * | 1/1996 | Phelan et al. .............. | 340/5.67 |
| 5,654,689 A | | 8/1997 | Peyre et al. | |
| 5,838,075 A | * | 11/1998 | Yamasaki .................. | 307/10.3 |
| 6,400,041 B1 | * | 6/2002 | Engelmann et al. ....... | 307/10.2 |

FOREIGN PATENT DOCUMENTS

| | | | |
|---|---|---|---|
| DE | 10039090 A1 | * | 2/2002 |
| EP | 0 706 919 A1 | | 4/1996 |
| EP | 0 909 685 A2 | | 4/1999 |
| FR | 2 731 965 A1 | | 9/1996 |
| WO | WO 01/23229 A1 | | 4/2001 |

* cited by examiner

*Primary Examiner*—Brian Sircus
*Assistant Examiner*—Daniel Cavallari
(74) *Attorney, Agent, or Firm*—Crompton, Seager & Tufte, LLC

(57) ABSTRACT

An electronic automotive anti-theft device that prevents unintentional operation. The anti-theft device includes a lock pin for engaging and disengaging at least one of a movable member of a steering mechanism and a movable member of a driving mechanism in an automobile. An actuator drives the lock pin. A control unit is connected to the actuator to control the actuator. A power supply line connects the control unit to a power supply. A power supply switch is connected to the power supply line to supply the control unit with power. The power supply switch disconnects the power supply line when the automobile is being driven or when the automobile is allowed to be driven.

9 Claims, 9 Drawing Sheets

ELECTRONIC AUTOMOTIVE ANTI-THEFT DEVICE

BACKGROUND OF THE INVENTION

The present invention relates to an electronic automotive anti-theft device, and more particularly, to an electronic steering wheel locking device that electronically prohibits the rotation of a steering wheel.

In the prior art, a steering wheel locking device is often used as an automotive anti-theft device. FIG. 1 shows an example of a conventional steering wheel locking device 51. The steering wheel locking device 51 includes a key cylinder 54 and a lock pin 52. A mechanical key (not shown) is inserted in the key cylinder 54 and turned. The lock pin 52 is engaged with or disengaged from a steering shaft 53 when the key is turned.

Engagement of the lock pin 52 with the steering shaft 53 locks the steering shaft, which in turn, locks a steering wheel (not shown). To drive the automobile, the lock pin 52 must be disengaged from the steering shaft 53 with the mechanical key.

Nowadays, electronic key systems are employed in automobiles to start an engine without using a mechanical key. It is thus desirable that such electronic key system be provided with an electronic steering wheel locking mechanism that drives an actuator to lock the steering wheel.

The electronic steering wheel locking device would require an electronic control unit (ECU) to control the actuator. However, electric noise may cause the ECU to function in an unintentional manner and drive the actuator in an undesirable manner. Accordingly, it is difficult to put the electronic steering wheel locking device into practical use since the steering wheel must be prevented from being locked when the automobile is being driven.

SUMMARY OF THE INVENTION

It is an object of the present invention to provide an electronic automotive anti-theft device that prevents unintentional operation.

To achieve the above object, the present invention provides an electronic automotive anti-theft device including a lock pin for engaging and disengaging at least one of a movable member of a steering mechanism and a movable member of a driving mechanism in an automobile. An actuator drives the lock pin. A control unit is connected to the actuator to control the actuator. A power supply line connects the control unit to a power supply. A power supply switch is connected to the power supply line to supply the control unit with power. The power supply switch disconnects the power supply line when the automobile is being driven or when the automobile is allowed to be driven.

A further perspective of the present invention is an electronic automotive anti-theft device incorporated in an automobile including a shift lever for changing gear positions. The gear positions include a parking position. The electronic automotive anti-theft device includes a lock pin for engaging and disengaging at least one of a movable member of a steering mechanism and a movable member of a driving mechanism in an automobile. An actuator drives the lock pin. A control unit is connected to the actuator to control the actuator. A power supply line connects the control unit to a power supply. A power supply switch is connected to a power supply line to supply the control unit with power. The power supply switch closes and supplies the control unit with power when the shift lever is located at the parking position. The power supply switch opens and stops supplying the control unit with power when the shift lever is not located at the parking position. A lock detection switch is connected parallel to the power supply switch. The lock detection switch closes and supplies the control unit with power when the lock pin is engaged with the movable member. The lock detection switch opens and stops supplying the control unit with power when the lock pin is disengaged from the movable member.

In the present invention, a state in which the automobile is being driven refers to any one of states in which the shift lever position is not located in the parking position, the engine is running, or the electrical system of the automobile is activated. Further, a state in which the automobile is allowed to be driven refers to a state in which the ID code of a portable device held by, for example, the driver and the ID code of the automobile match or when an authorized mechanical key is inserted in a key cylinder of the automobile.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
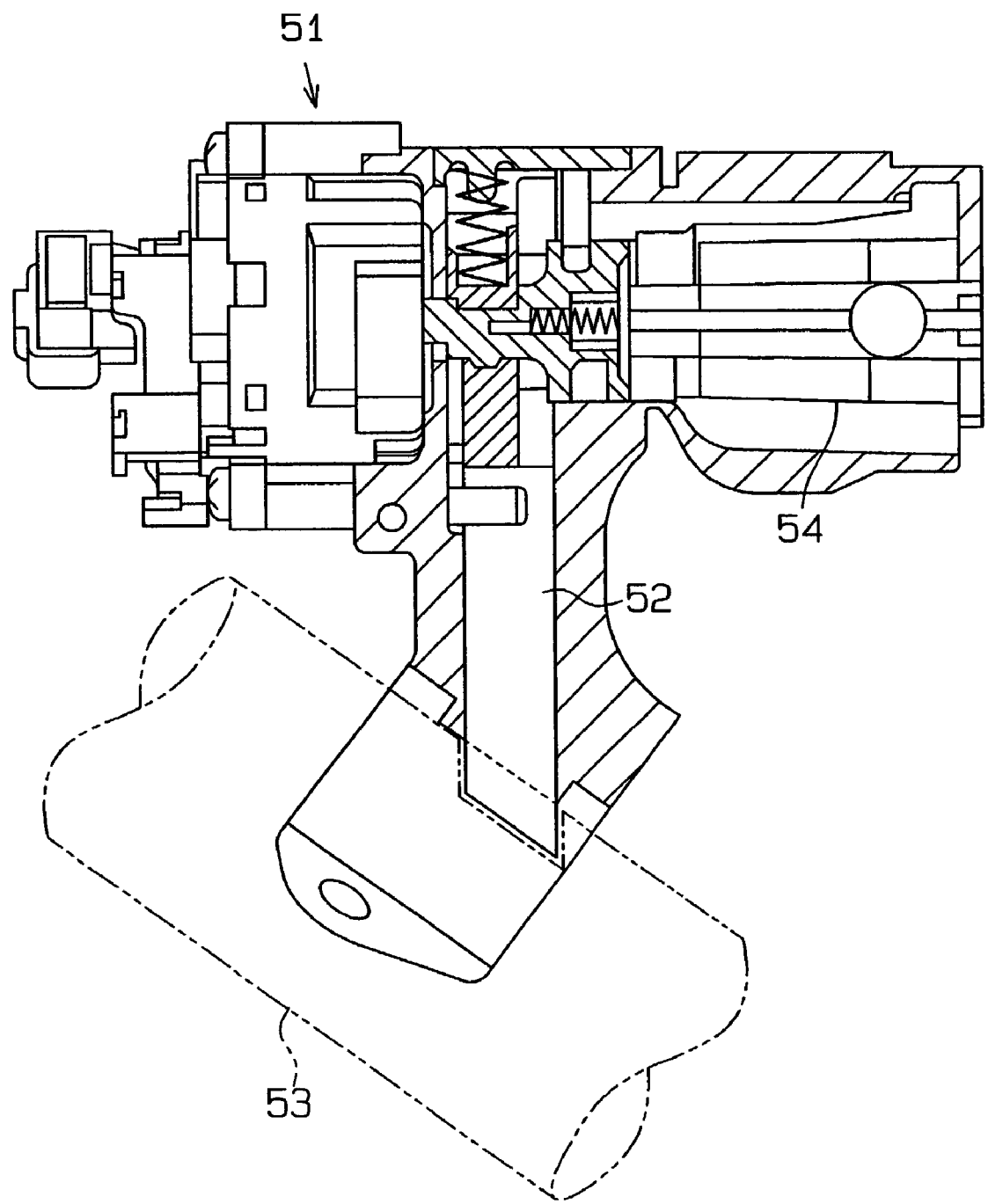
FIG. 1 is a schematic cross-sectional view showing a prior art electronic automotive anti-theft device.

In the drawings, like numerals are used for like elements throughout.

An electronic automotive anti-theft device according to a first embodiment of the present invention will now be discussed with reference to FIGS. 2 to 5. In the first embodiment, the electronic automotive anti-theft device corresponds to an electronic steering wheel locking device 1. An electronic steering wheel locking device is also used as the electronic automotive anti-theft device in the following embodiments.

Figure 2:
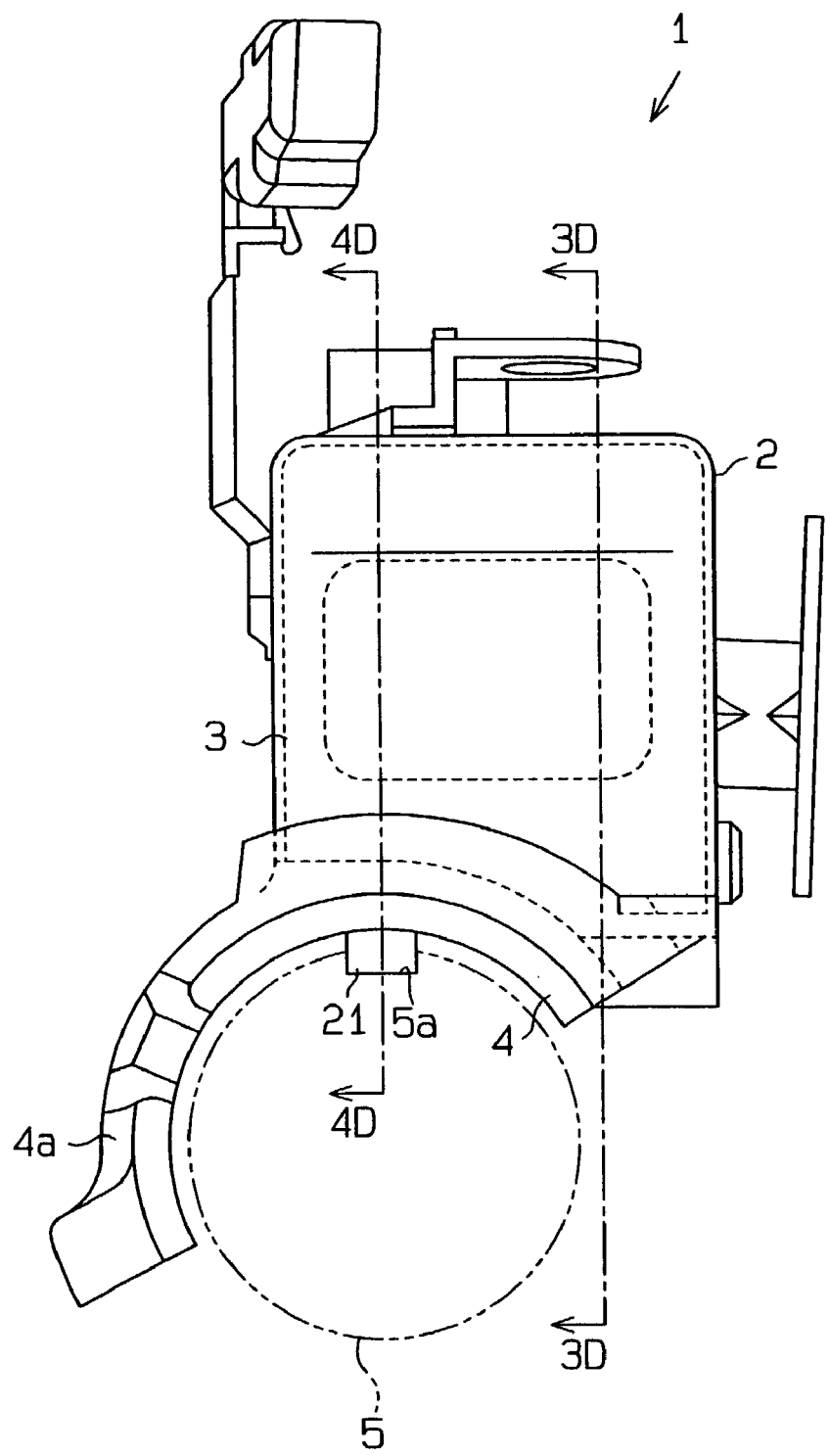
FIG. 2 is a schematic side view showing an electronic automotive anti-theft device according to a first embodiment of the present invention.
Figure 3:
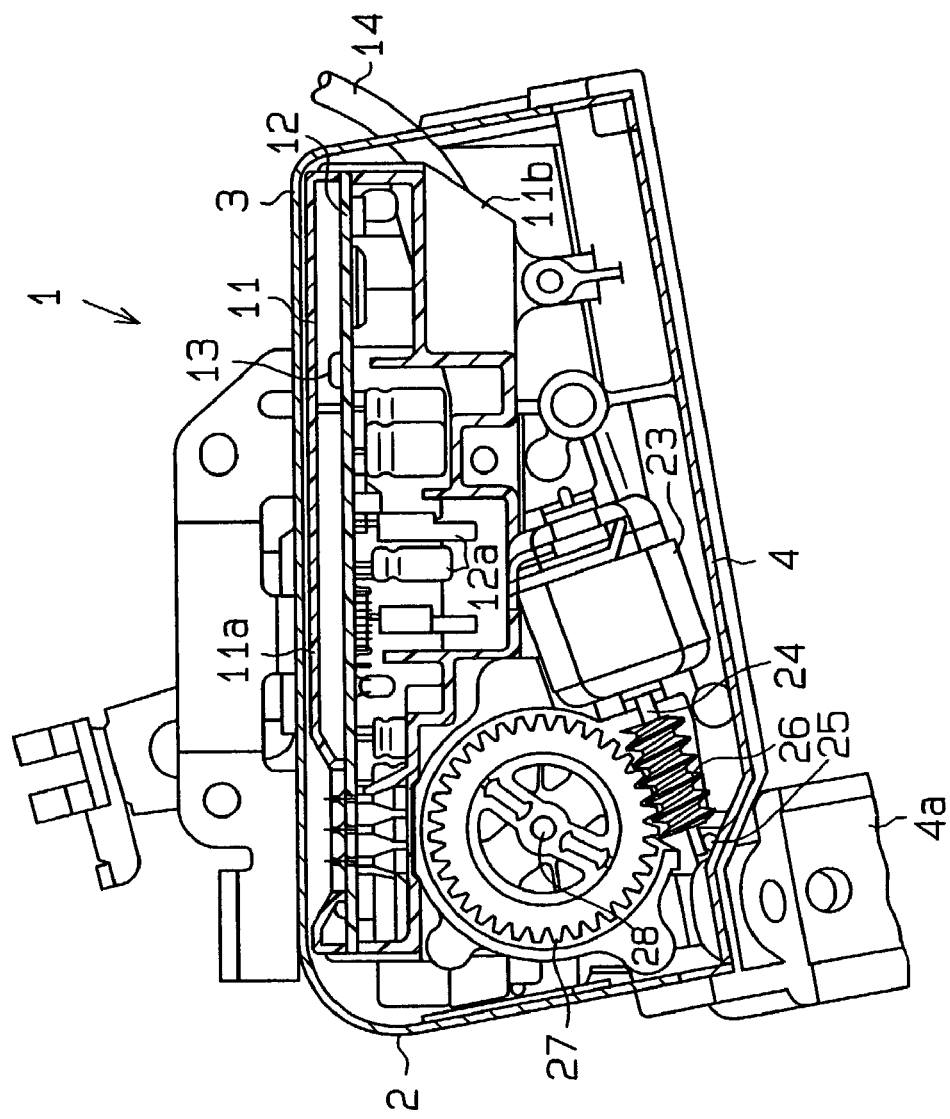
FIG. 3 is a cross-sectional view taken along line 3D—3D in FIG. 2.
Figure 4:
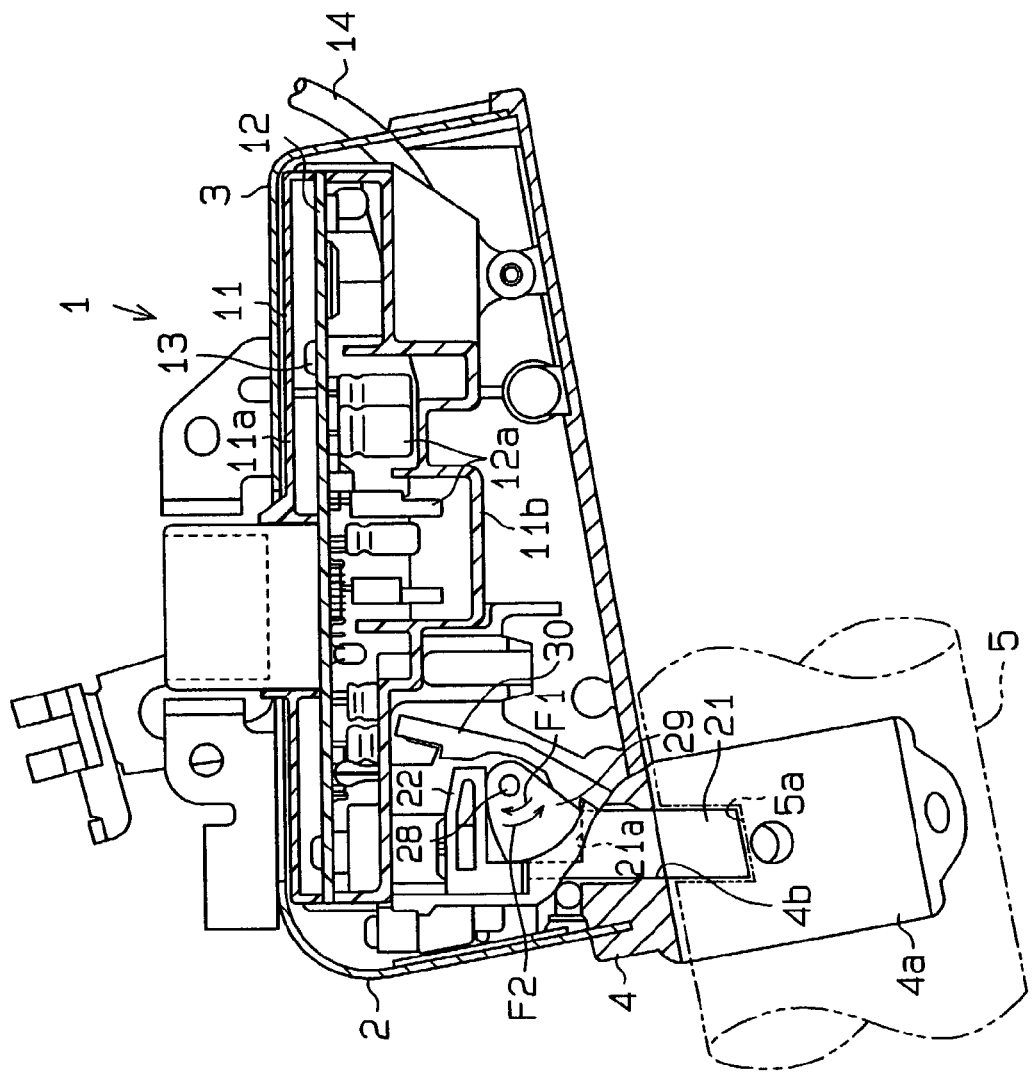
FIG. 4 is a cross-sectional view taken along line 4D—4D in FIG. 2.

As shown in FIGS. 2 to 4, the electronic steering wheel locking device 1 is attached to a steering post (not shown). The electronic steering wheel locking device 1 has a generally box-like case body 2. The case body 2 includes a cover 3, which is attached to a lock body 4.

As shown in FIGS. 3 and 4, an accommodating case 11, which is made of synthetic resin, is arranged in the cover 3. The accommodating case 11 includes a first case 11a and a second case 11b. A printed-circuit board 12 is accommodated in the accommodating case 11. The printed-circuit board 12 is fastened to the second case 11b by a screw 13. An electronic control unit (ECU) 31, which includes electronic devices such an integrated circuit or a capacitor, is connected to the printed-circuit board 12. The printed-circuit board 12 is connected to a verification ECU 37, which is arranged outside the case body 2, by a wire 14.

An attachment 4a extends from the lock body 4. The attachment 4a is attached to a column tube (not shown) by a bolt. A steering shaft 5, which is movable, is inserted through the column tube. A slot 5a is formed in the outer surface of the steering shaft 5. Referring to FIG. 4, the lock body 4 has a rectangular guide hole 4b, which is arranged in correspondence with the attachment 4a. When the case body 2 is attached to the column tube, the guide hole 4b is connected to the interior of the column tube.

Referring to FIG. 4, a lock pin 21 is arranged in the guide hole 4b. The lock pin 21 is movable along the wall of the guide hole 4b. A pressed portion 21a and a follower 22 are provided on the basal portion of the lock pin 21. The distal portion of the lock pin 21 projects from the outer surface of the lock body 4. The lock pin 21 is parallelepiped. The cross-sectional area of the lock pin 21 is smaller than the cross-sectional area of the guide hole 4b. The distal portion of the lock pin 21 engages and disengages the slot 5a.

As shown in FIG. 3, a motor 23, which functions as an actuator, is accommodated in the case body 2. A first rotary shaft 24 extends out of the motor 23. A support pin 25 contacts the distal portion of the first rotary shaft 24. The support pin 25 is used to support the first rotary shaft 24. A worm gear 26 is fitted on the first rotary shaft 24. The worm gear 26 rotates integrally with the first rotary shaft 24. The worm gear 26 is meshed with a spur gear 27 to drive the spur gear 27. The spur gear 27 rotates about a second rotary shaft 28, which is fixed to the spur gear 27.

As shown in FIG. 4, a cam 29 is fixed to the second rotary shaft 28. When the motor 23 rotates the first rotary shaft 24 in the forward direction, the cam 29 pivots about the second rotary shaft 28 in the clockwise direction (the direction indicated by arrow F1 in FIG. 4). When the motor 23 rotates the first rotary shaft 24 in the reverse direction, the cam 29 pivots about the second rotary shaft 28 in the counterclockwise direction (the direction indicated by arrow F2 in FIG. 4). Thus, when the cam 29 is pivoted in the direction of arrow F1, the cam 29 pushes the follower 22 and disengages the distal portion of the lock pin 21 from the slot 5a.

When the cam 29 is pivoted in the direction indicated by arrow F2, the cam 29 pushes the pressed portion 21a of the lock pin 21. This engages the distal portion of the lock pin 21 with the slot 5a. The motor 23 drives the cam 29 by means of the worm gear 26 and spur gear 27.

When the motor 23 is not driven, the worm gear 26 restricts the rotation of the spur gear 27 and prohibits the movement of the lock pin 21 even if a force is applied to the lock pin 21 in the direction which it engages or disengages the slot 5a. In other words, the lock pin 21 engages or disengages the slot 5a only when the motor 23 is driven. Accordingly, the drive mechanism of the lock pin 21, which includes the worm gear 26, the spur gear 27, and the cam 29, has a self-retaining function that retains the lock pin 21 in a state engaged with or disengaged from the slot 5a. The drive mechanism of the lock pin 21 is not limited to the above structure.

The pivoting range of the cam 29 is restricted by contact between the cam 29 and a rubber stopper 30. The ECU 31 controls the motor 23, which drives the cam 29.

The configuration of the ECU 31 will now be discussed with reference to FIG. 5. The ECU 31 is connected to the motor 23, a shift lever switch 36, and the verification ECU 37.

The shift lever switch 36, which is located near a shift lever 39, is opened and closed in accordance with the movement of the shift lever 39. The shift lever switch 36 is opened when the shift lever 39 is located at a parking position and closed when the shift lever 39 is located at other gear positions. The shift lever switch 36 is a contact type switch, such as a limit switch or a reed switch that opens and closes contacts in accordance with the shift lever position. The employment of the mechanical shift lever switch 36 simplifies the circuit. In addition, the mechanical shift lever switch 36 is hardly affected by noise. Thus, noise does not cause the shift lever switch 36 to function in an unintentional manner. When the shift lever 39 is located at the parking position, the shift lever 39 is arranged at the "P" position or the automobile transmission is in a parking lock state.

The verification ECU 37 communicates with a portable device (not shown) held by an owner of the automobile (i.e., the driver) and compares its own ID code with an ID code of the portable device to verify the portable device. When the ID codes match, the verification ECU 37 allows the engine to the started. In other words, if the ID codes do not match, the verification ECU 37 prohibits the starting of the engine. In the first embodiment, the engine is started and stopped when an engine switch (not shown), which is arranged in the passenger compartment, is operated.

In response to the ID code verification, the verification ECU 37 generates an encoded drive request signal and provides the drive request signal to the ECU 31. More specifically, the verification ECU 37 provides the ECU 31 with a drive request signal including an unlocking code when the ID codes match. When the ID codes do not match, the verification ECU 37 provides the ECU 31 with a drive request signal including a locking code.

Figure 5:
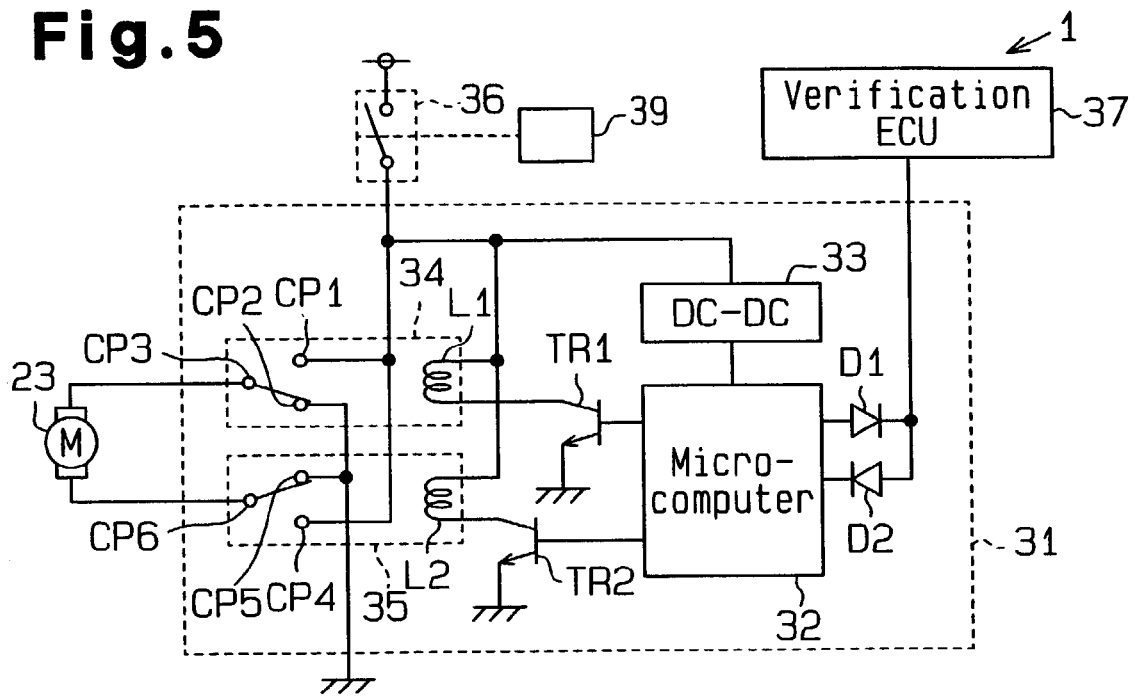
FIG. 5 is a schematic circuit diagram of the electronic automotive anti-theft device of FIG. 2.

Referring to FIG. 5, the ECU 31 includes a microcomputer 32, a DC-DC converter 33, two transistors TR1, TR2, two diodes D1, D2, and two relays 34, 35, which function as switches. The microcomputer 32 is configured by a CPU (not shown), which includes a ROM and a RAM. The output terminal of the DC-DC converter 33 and the base of each of the transistors TR1, TR2 are connected to the microcomputer 32.

The DC-DC converter 33 converts battery voltage to drive voltage of the microcomputer 32 and supplies the drive voltage to the microcomputer 32. The input terminal of the DC-DC converter is connected to one terminal of the shift lever switch 36. The other terminal of the shift lever switch 36 is connected to a positive terminal of a battery (not shown). That is, the DC-DC converter 33 is connected to the positive terminal of the battery by way of the shift lever switch 36.

The relays 34, 35 respectively include coils L1, L2. Each of the coils L1, L2 has one terminal connected to a line connecting the DC-DC converter 33 and the shift lever switch 36. The other terminal of the coil L1 is connected to the collector of the transistor TR1, and the other terminal of the coil L2 is connected to the collector of the transistor TR2. The emitters of the transistors TR1, TR2 are grounded. When the microcomputer 32 provides the bases of the transistors TR1, TR2 with a control signal having a high level, the transistors TR1, TR2 are actuated. This results in current flowing through the associated coils L1, L2 of the relays 34, 35. That is, the relays 34, 35 are driven when the control signal of the microcomputer 32 is high.

The relay 34 has a first fixed contact CP1, a second fixed contact CP2, and a movable contact CP3. The relay 35 has a first fixed contact CP4, a second fixed contact CP5, and a movable contact CP6. The first fixed contacts CP1, CP4 of the relays 34, 35 are connected to the line connecting the DC-DC converter 33 and the shift lever switch 36. The second fixed contacts CP2, CP5 of the relays 34, 35 are grounded. The movable contact CP3 of the relay 34 is connected to one terminal of the motor 23, and the movable contact CP6 of the relay 35 is connected to the other terminal of the motor 23.

When the relays 34, 35 are activated, the movable contacts CP3, CP6 of the relays 34, 35 are connected to the first fixed contacts CP1, CP4, respectively, to drive the motor 23. When the relays 34, 35 are de-activated, the movable contacts CP3, CP6 of the relays 34, 35 are connected to the second fixed contacts CP2, CP5, respectively, to drive the motor 23.

In the first embodiment, the shift lever switch 36 is arranged along a line through which power is supplied to the microcomputer 32, the relays 34, 35, and the motor 23. Thus, when the shift lever switch 36 is opened, the microcomputer 32, the relays 34, 35, and the motor 23 are not supplied with power. When the shift lever 39 is in the parking position, the shift lever switch 36 is closed, and the ECU 31 generates a control signal at a high level. The motor 23 is driven in accordance with the high control signal.

The microcomputer 32 is connected to the verification ECU 37 by the two diodes D1, D2. More specifically, the microcomputer 32 is connected to the anode of the diode D1 and the cathode of the diode D2, and the verification ECU 37 is connected to the cathode of the diode D1 and the anode of the diode D2. When the verification ECU 37 provides the microcomputer 32 with the drive request signal via the diode D2, the microcomputer 32 provides the transistors TR1, TR2 with control signals that are in accordance with the drive request signal.

More specifically, when the microcomputer 32 is provided with a drive request signal that includes an unlocking code, the microcomputer 32 provides the transistor TR1 with a high control signal and activates the transistor TR1. This excites the coil L1 of the relay 34 and connects the movable contact CP3 to the first fixed contact CP1. As a result, the first rotary shaft 24 of the motor 23 rotates in the forward direction. When the relay 34 is actuated, the cam 29 is pivoted in the direction indicated by arrow F1 of FIG. 4. This disengages the distal portion of the lock pin 21 from the slot 5a.

When the microcomputer 32 is provided with a drive request signal that includes a locking code, the microcomputer 32 provides the transistor TR2 with a high control signal and activates the transistor TR2. This excites the coil L2 of the relay 35 and connects the movable contact CP6 to the first fixed contact CP4. As a result, the first rotary shaft 24 of the motor 23 rotates in the reverse direction. When the relay 35 is actuated, the cam 29 is pivoted in the direction indicated by arrow F2 of FIG. 4. This engages the distal portion of the lock pin 21 with the slot 5a.

The electronic steering wheel locking device 1 of the first embodiment has the advantages described below.

(1) The mechanical shift lever switch 36 is connected to the power supply line of the microcomputer 32, the relays 34, 35, and the motor 23. The shift lever switch 36 is closed only when the shift lever 39 is located at the parking position and opened when the shift lever 39 is located at other gear positions. Thus, the motor 23 is driven only when the shift lever 39 is located at the parking position. When the automobile is being driven, the shift lever 39 is located at a position other than the parking position. Thus, the driving of the motor 23 is prohibited when the automobile is being driven. This prevents noise from causing unintentional operation of the electronic steering wheel locking device 1.

(2) The shift lever switch 36 is connected to the power supply line of the ECU 31. Thus, when the shift lever switch 36 is opened, the ECU 31 stops functioning. This prevents noise from causing unintentional operation of the electronic steering wheel locking device 1. Further, since the shift lever switch 36 and the ECU 31 are connected by a single line, the wiring between the shift lever switch 36 and the ECU 31 is simplified.

(3) The shift lever switch 36 is arranged upstream to the ECU 31. Thus, even if the circuit is short circuited with the vehicle body at a location downstream of the shift lever switch 36, current leakage caused by the short circuit does not flow to the microcomputer 32, the relays 34, 35, and the motor 23 as long as the switch 36 is opened. This prevents current leakage from causing unintentional operation of the electronic steering wheel locking device 1.

An electronic steering wheel locking device 1A according to a second embodiment of the present invention will now be discussed with reference to FIGS. 6 and 7. Only parts differing from the first embodiment will embodiment will be described below.

Figure 6:
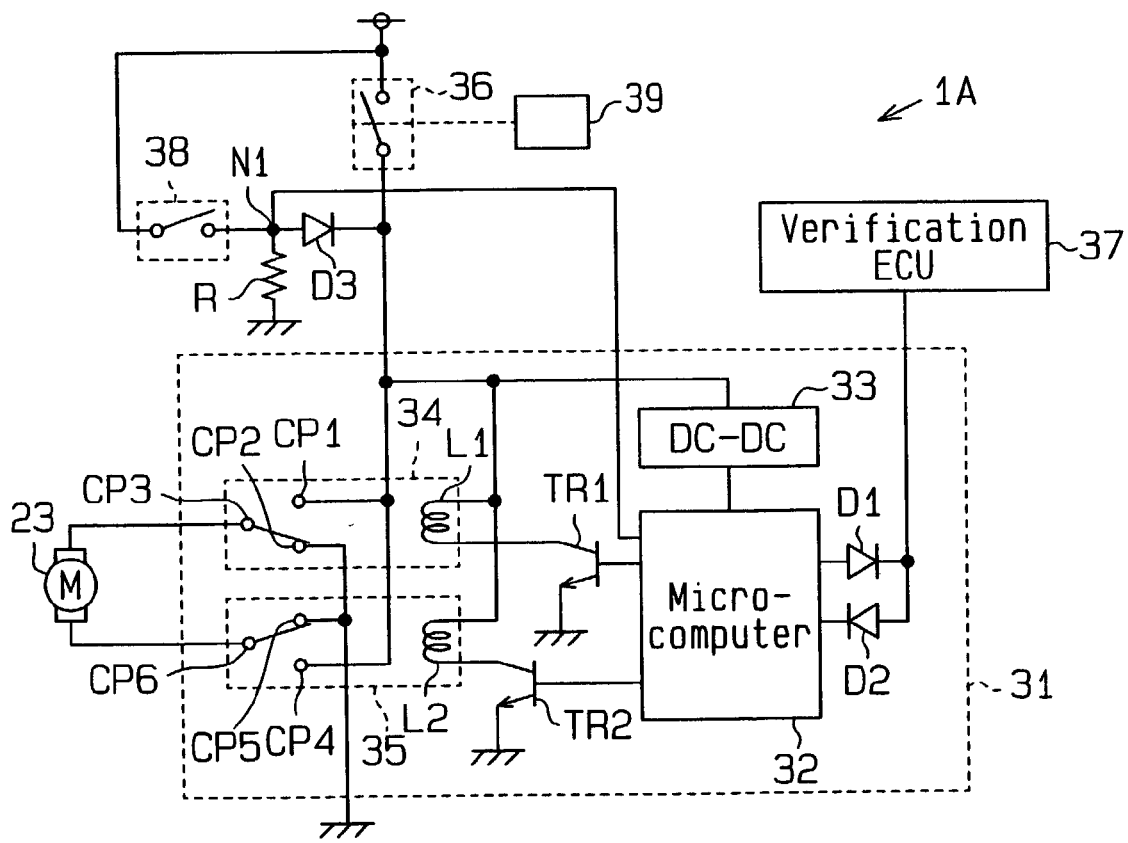
FIG. 6 is a schematic circuit diagram of an electronic automotive anti-theft device according to a second embodiment of the present invention.

Referring to FIG. 6, the second embodiment differs from the first embodiment in that a lock detection switch 38, a resistor R, and a diode D3 are connected to the ECU 31.

Figure 7A:
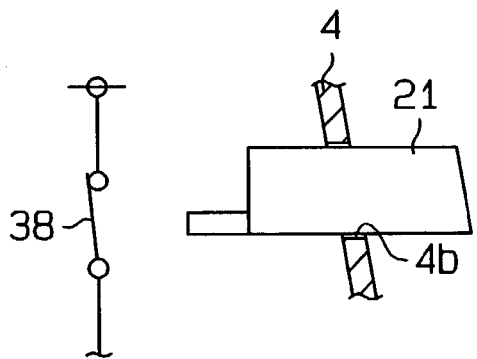
FIGS. 7A and 7B are schematic diagrams showing the relationship between a lock detection switch and a lock pin that are used in the electronic anti-theft device of FIG. 6.
Figure 7B:
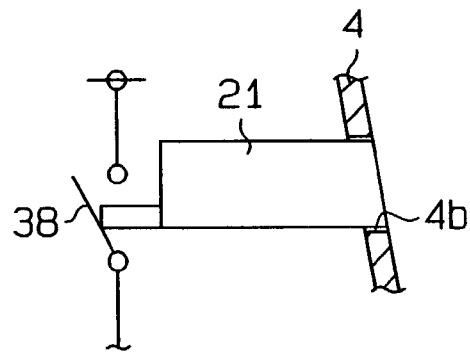

Referring to FIG. 7A, the lock detection switch 38 is a normally closed type mechanical switch, which is arranged near the basal portion of the lock pin 21. In the second embodiment, the lock detection switch 38 is a limit switch. The lock detection switch 38 is closed, as shown in FIG. 7A, when the lock pin 21 projects from the guide hole 4b of the lock body 4 and engages the slot 5a of the steering shaft 5. The lock detection switch 38 is opened, as shown in FIG. 7B, when the lock pin 21 is accommodated in the lock body 4 and disengaged from the slot 5a.

As shown in FIG. 6, the lock detection switch 38 is connected parallel to the shift lever switch 36. Thus, when either the shift lever switch 36 or the lock detection switch 38 is closed, the ECU 31 is supplied with power. One terminal of the lock detection switch 38 is connected to the positive terminal (not shown) of a battery, and the other terminal of the lock detection switch 38 is connected to the anode of the diode D3 and one terminal of the resistor R. The other terminal of the resistor R is grounded. The cathode of the diode D3 is connected to a line connecting the shift lever switch 36 with the first fixed contacts CP1, CP4 of the relays 34, and 35.

The lock detection switch 38 is connected parallel to the shift lever switch 36. Thus, the ECU 31 is supplied with power when either the shift lever switch 36 or the lock detection switch 38 is closed. This supplies the ECU 31 with power and continuously drives the motor 23 until the lock detection switch 38 is opened when the shift lever switch 36 is opened before the lock pin 21 is disengaged from the slot 5a. Thus, the motor 23 is continuously driven until the lock pin 21 is disengaged from the slot 5a even if the shift lever 39 is shifted to a position other than the parking position when the lock pin 21 is still engaged with the slot 5a. After the lock pin 21 is completely disengaged from the slot 5a, the supply of power to the motor 23 is cut. Thus, the motor 23 stops running upon completion of the disengagement of the lock pin 21 from the slot 5a.

The microcomputer 32 and the resistor (detection circuit) R are connected to a node N1 between the lock detection switch 38 and the anode of the diode D3. The potential (detection signal) at node N1 is supplied to the microcomputer 32. The potential at node N1 is high when the lock detection switch 38 is closed and low when the detection switch 38 is opened. Thus, the microcomputer 32 detects the opening and closing of the lock detection switch 38 from the potential (detection signal) at node N1.

When the detection result of the potential at node N1 changes, the microcomputer 32 stops providing the transistors TR1, TR2 with the control signal and stops driving the motor 23. The microcomputer 32 provides the detection result to the verification ECU 37 via the diode D1. The verification ECU 37 recognizes the state of engagement between the lock pin 21 and the slot 5a from the detection result of the potential at node N1.

In addition to the advantages of the first embodiment, the electronic steering wheel locking device 1A of the second embodiment has the advantages described below.

(1) The motor 23 is continuously driven until the lock pin 21 is disengaged from the slot 5a even if the shift lever switch 36 is opened. Thus, even if the shift lever switch 36 is opened before the lock pin 21 is disengaged from the slot 5a, the rotation of the steering shaft 5 is not prohibited. Accordingly, the disengagement of the lock pin 21 from the slot 5a is guaranteed.

When the lock pin 21 is disengaged from the slot 5a, the supply of power to the motor 23 is cut. Thus, even if noise causes the microcomputer 32 to provide the transistors TR1, TR2 with a control signal, the control signal does not drive the motor 23.

(2) The microcomputer 32 monitors the state of the lock detection switch 38 and stops driving the motor 23 when the state of the lock detection switch 38 changes. Thus, the motor 23 stops when the engagement or disengagement of the lock pin 21 and the slot 5a is completed. This reduces the load applied to the motor 23 and prolongs the life of the motor 23.

An electronic steering wheel locking device 10 according to a third embodiment of the present invention will now be discussed with reference to FIGS. 8 and 9. The third embodiment differs from the first embodiment in that a switching device, which operates in accordance with an ignition signal, is used in lieu of the shift lever switch 36.

Figure 8:
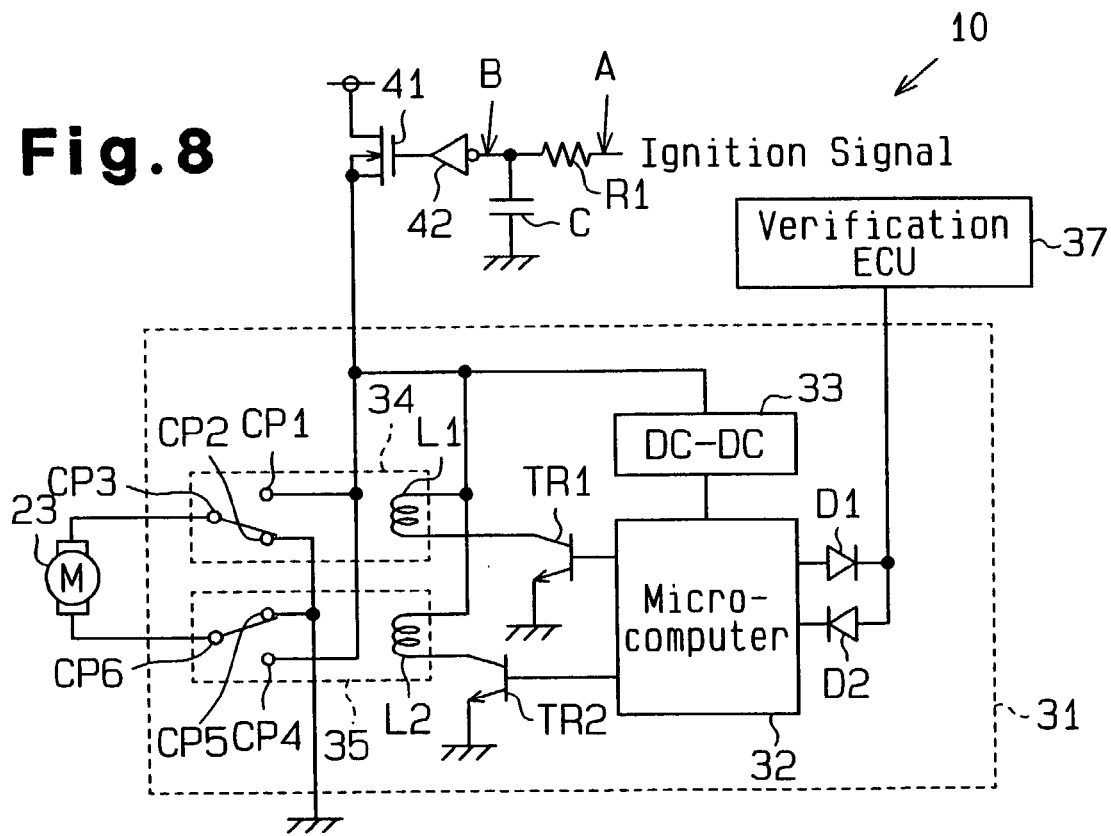
FIG. 8 is a schematic circuit diagram of an electronic anti-theft device according to a third embodiment of the present invention.
Figure 9:
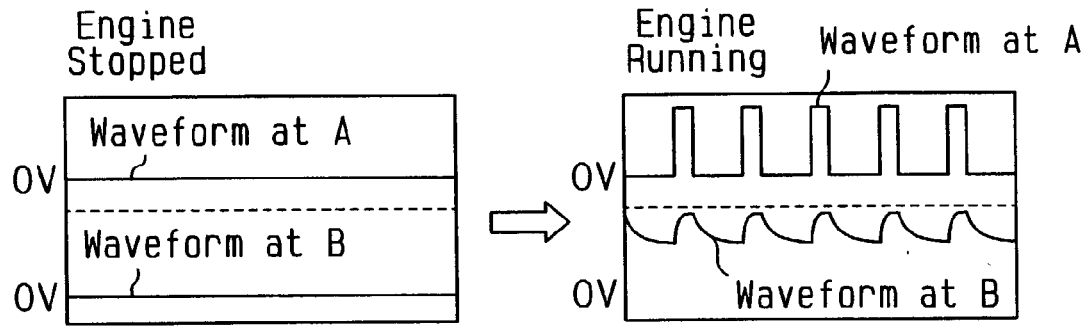
FIG. 9 is a diagram showing the waveform of an ignition signal for controlling the operation of a power supply switch used in the electronic anti-theft device of FIG. 8.

More specifically, as shown in FIG. 8, the switching device, which is an n-channel power MOSFET (FET) 41, is connected to a line connecting a battery and the ECU 31. The drain of the FET (field-effect transistor) 41 is connected to the battery, and the source of the FET 41 is connected to the ECU 31. The output terminal of an inverter 42 is connected to the gate of the FET 41. The FET 41 is activated when it receives an operation signal having a high level from the inverter 42. The input terminal of the inverter 42 is connected to one terminal of the resistor R1 and one terminal of the capacitor C. The other terminal of the capacitor C is grounded. The other terminal of the resistor R1 receives an ignition signal from the engine.

The waveform of the ignition signal at the location indicated by arrow A in FIG. 8 remain low and constant when the engine is not running. When the engine is running, the signal at the location indicated by arrow A forms a pulse-like waveform, or an ignition pulse. The waveform of the ignition signal at the location indicated by arrow B in FIG. 8 remains low and constant when the engine stops running. When the engine is running, the resistor R1 and the capacitor C integrate the ignition signal, and the ignition signal continues to have a substantially high level.

Therefore, when the engine stops running and the ignition signal is low, the inverter 42 stops providing the FET 41 with the operation signal. Accordingly, the FET 41 connects the line through which power is supplied to the ECU 31 only when the engine stops running and disconnects the power supply line when the engine is running.

The advantages of the electronic steering wheel locking device 10 will now be discussed.

(1) When the engine is running, the FET 41 disconnects the power supply line of the ECU 31 to stop driving the motor 23. This prevents the electronic steering wheel locking device 10 from functioning in an unintentional manner when the engine is running.

(2) The ignition signal is used to detect a state in which the engine is running. This guarantees the detection of the running engine and prevents the motor 23 from being in an unintentional manner operated when engine is running.

It should be apparent to those skilled in the art that the present invention may be embodied in many other specific forms without departing from the spirit or scope of the invention. Particularly, it should be understood that the present invention may be embodied in the following forms.

Figure 10:
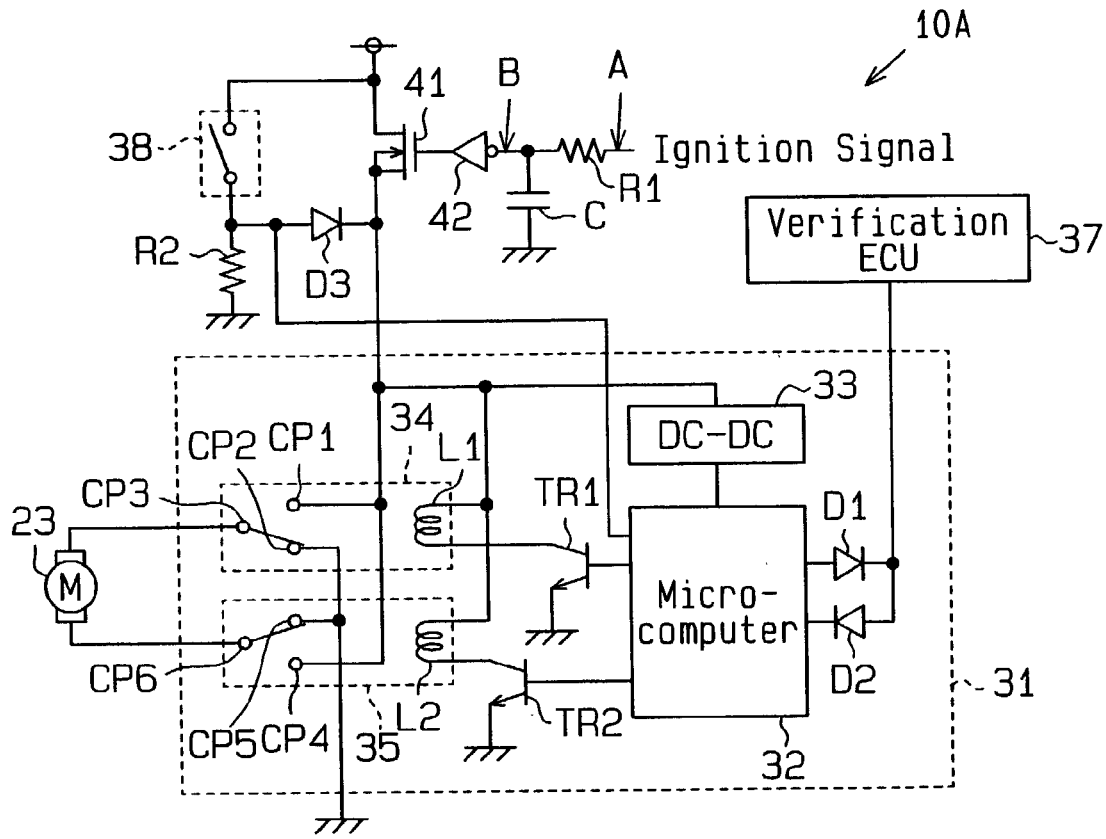
FIGS. 10 to 13 are schematic circuit diagrams of electronic automotive anti-theft devices according to further embodiments of the present invention.

As shown in FIG. 10, a lock detection switch 38, a resistor R2, and a diode D3, which are connected parallel to the FET 41 (power supply switch) may be added to the configuration of the third embodiment. In this case, even if the engine is started before the lock pin 21 is disengaged from the slot 5a, the rotation of the steering shaft 5 is permitted. Thus, advantages (4) and (5) are obtained. The lock detection switch 38, the resistor R2, and the diode D3 may also be connected parallel to the various types of power supply switches in the following embodiments.

In the third embodiment, the FET 41 may be activated in accordance with a parameter indicating the running state of the engine, such as the vehicle velocity of an alternator output.

Figure 11A:
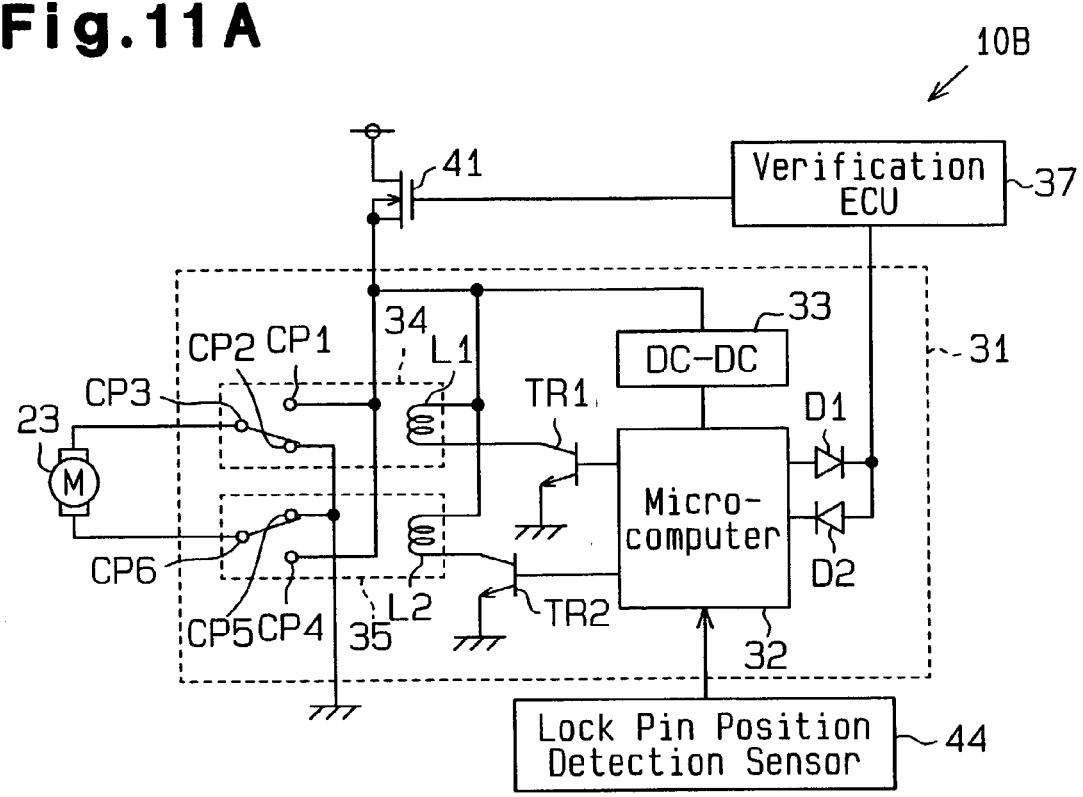

The FET 41 of the third embodiment may be activated in accordance with, for example, an output signal from the verification ECU 37 like in an electronic steering wheel locking device 10B, which is shown in FIG. 11A. More specifically, the verification ECU 37 is connected to the gate of the FET 41. In this case, a lock pin position detection sensor 44, which detects whether the lock pin 21 is engaged with or disengaged from the slot 5a, is connected to the microcomputer 32. The lock pin position detection sensor 44 may be the lock detection switch 38 or an optical sensor, such as a photo interrupter.

When the lock pin 21 is disengaged from the slot 5a, the microcomputer 32 controls the unlocking signal in accordance with the detection of the lock position detection signal and provides the unlocking signal to the verification ECU 37. When the ID codes of the portable device and the verification ECU 37 match and the verification ECU 37 receives the unlocking signal from the microcomputer 32, the verification ECU 37 stops providing the FET 41 with the operation signal and disconnects the line through which the ECU 31 is supplied with power. When the driver enters the automobile and disengages the lock pin 21 from the slot 5a, the line for supplying power to the ECU 31 is disconnected. Since the power supply line of the ECU 31 is disconnected by an ECU other than the ECU 31 (i.e., the verification ECU 37), the electronic steering wheel locking device 10B does not function in an unintentional manner unless the ECU 31 and 37 both function in an unintentional manner. Accordingly, unintentional operation of the electronic steering wheel locking device 10B is prevented.

Figure 11B:
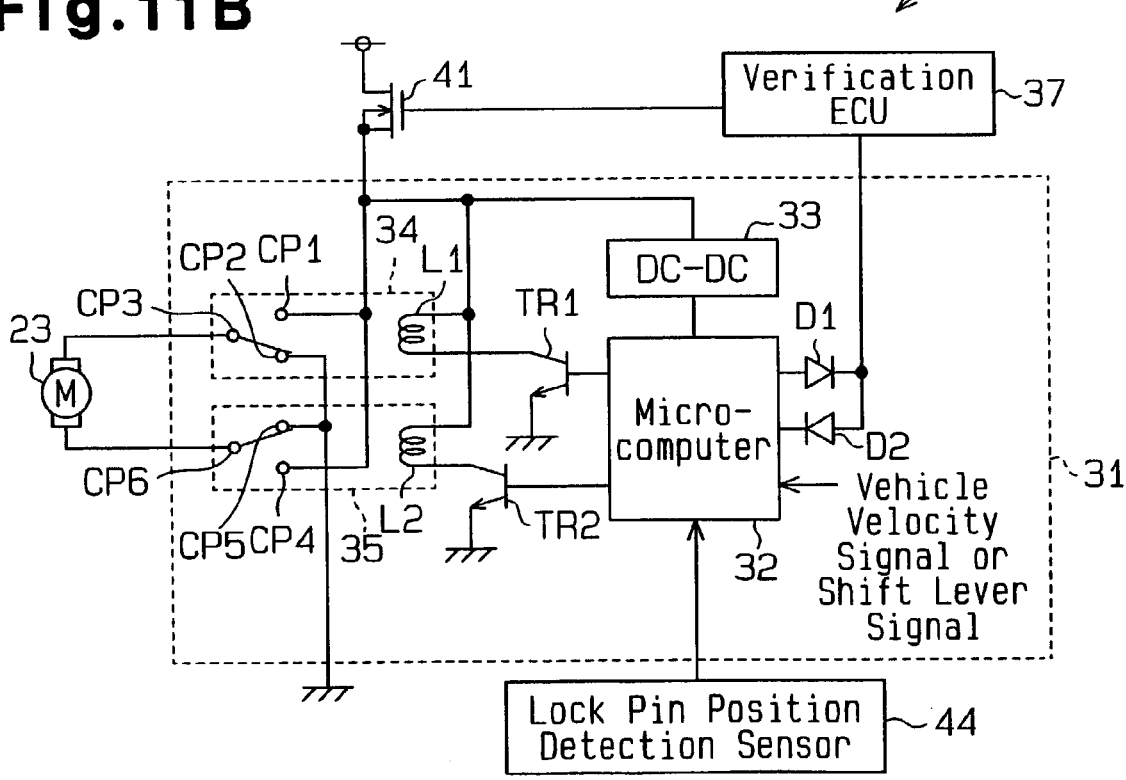

The microcomputer 32 may be provided with a vehicle velocity signal or a shift lever signal like in an electronic steering wheel locking device 10C of FIG. 11B. The microcomputer 32 stops providing the transistors TR1, TR2 with a drive signal when the vehicle speed signal indicates that the automobile is traveling or when the shift lever signal indicates that the shift lever 39 is not located at the parking position. In this case, even if the verification ECU 37 functions in an unintentional manner and provides the microcomputer 32 with the drive signal, the microcomputer 32 does not drive the motor 23 when the shift lever 39 is not located at the parking position. Accordingly, unintentional operation of the electronic steering wheel locking device 10C is prevented when the automobile is traveling.

In the electronic steering wheel locking device 10C, the FET 41 may be activated by an engine ECU or a shift lever ECU. In this case, the electronic steering wheel locking device does not function in an unintentional manner unless the ECU controlling the activation of the FET 41, the ECU 31, and the verification ECU 37 all function in an unintentional manner. Accordingly, the prevention of unintentional operation of the electronic steering wheel locking device 10C is further prevented.

In the first embodiment, the shift lever switch 36 may be replaced by a switching device that disconnects the power supply line of the ECU 31 when a line for supplying power to an ignition system is conductive and the electrical system of the automobile is activated (i.e., when power is supplied to an electronic fuel injector or other electric components).

Figure 12:
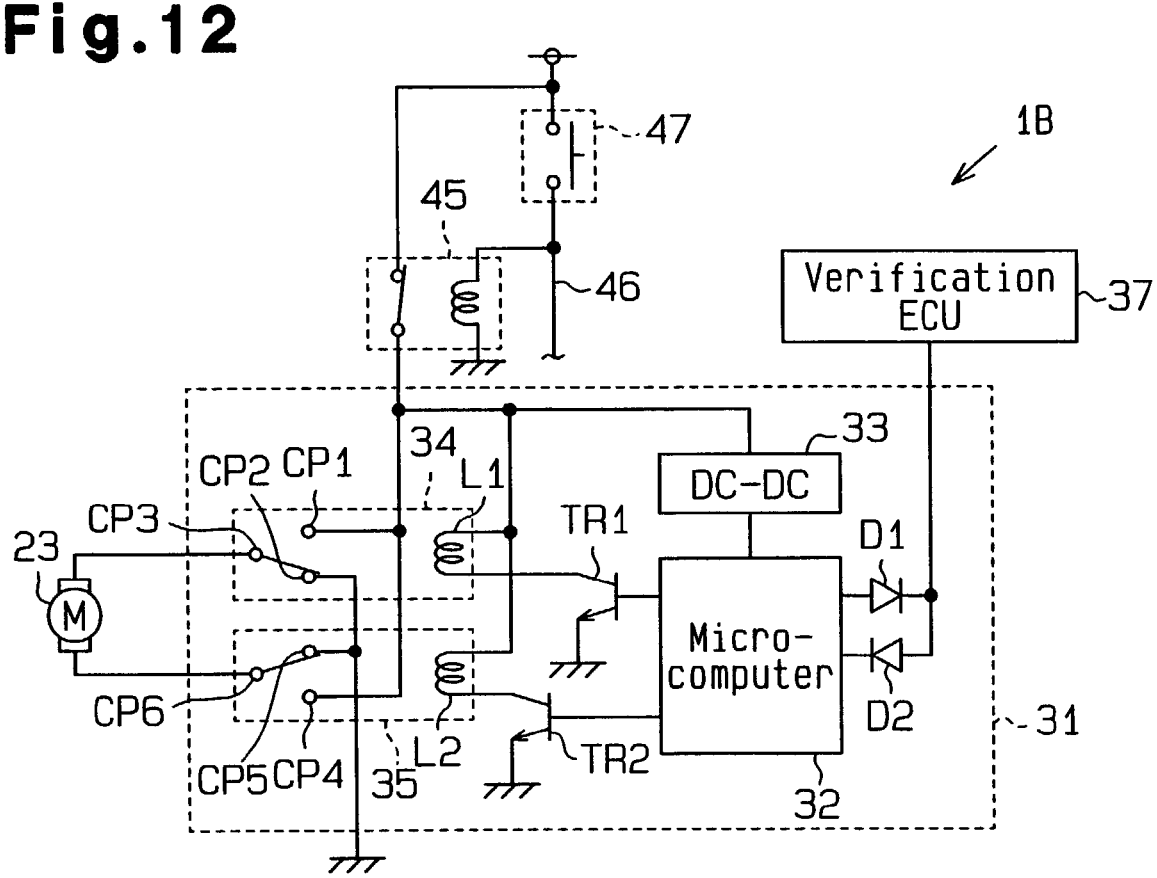

More specifically, like an electronic steering wheel locking device 1B shown in FIG. 12, a contact portion of a relay 45, which is a switching device, is connected to a line that connects the battery and the ECU 31. The relay 45 has a coil, which is connected parallel to an ignition system power supply line 46.

The contact portion of the relay 45 is a B contact (normally closed). One terminal of the contact portion is connected to the battery, and the other terminal of the contact portion is connected to the ECU 31. The coil of the relay 45 has one terminal connected to one terminal of an ignition switch 47. The other terminal of the coil is grounded. The other terminal of the ignition switch 47, which is a contact holding switch, is connected to the battery. When the ignition switch 47 is closed, the ignition system power supply line 46 is supplied with power and the contact portion of the relay 45 is opened. Thus, when the ignition system power supply line 46 is supplied with power, the line for supplying power to the ECU 31 is disconnected. This causes the ECU 31 to stop functioning. Normally, power is supplied to the ignition system power supply line 46 when the engine is running or the automobile is traveling. This prevents the electronic steering wheel locking device 1B from functioning in an unintentional manner when the engine is running or when the automobile is traveling. In this case, the power supply switch corresponds to the relay 45, which disconnects the power supply line of the ECU 31 when the electrical system of the automobile is activated.

In addition to activating the electrical system, the ignition switch 47 functions to start and stop the engine. The switching device may be a contactless switching device, such as a power transistor.

In each of the above embodiments, the engine may be started or stopped by inserting a mechanical key into a key cylinder and rotating the key. In this case, for example, the shift lever switch 36 of the first embodiment may be changed to a key switch that disconnects the power supply line of the ECU 31 when the mechanical key is inserted in the key cylinder. To use the key switch, the lock pin 21 must be disengaged from the slot 5a before inserting the mechanical key into the key cylinder. Accordingly, the ECU 37 may compare the ID codes before the mechanical key is inserted in the key cylinder and the lock detection switch 38 of the second embodiment may be connected parallel to the key switch.

In the first embodiment, a parking brake switch, which is closed when the parking brake is actuated, may be used in lieu of the shift lever switch 36. Alternatively, the shift lever switch 36 and the parking brake switch may be used together and connected in series with each other.

Figure 13:
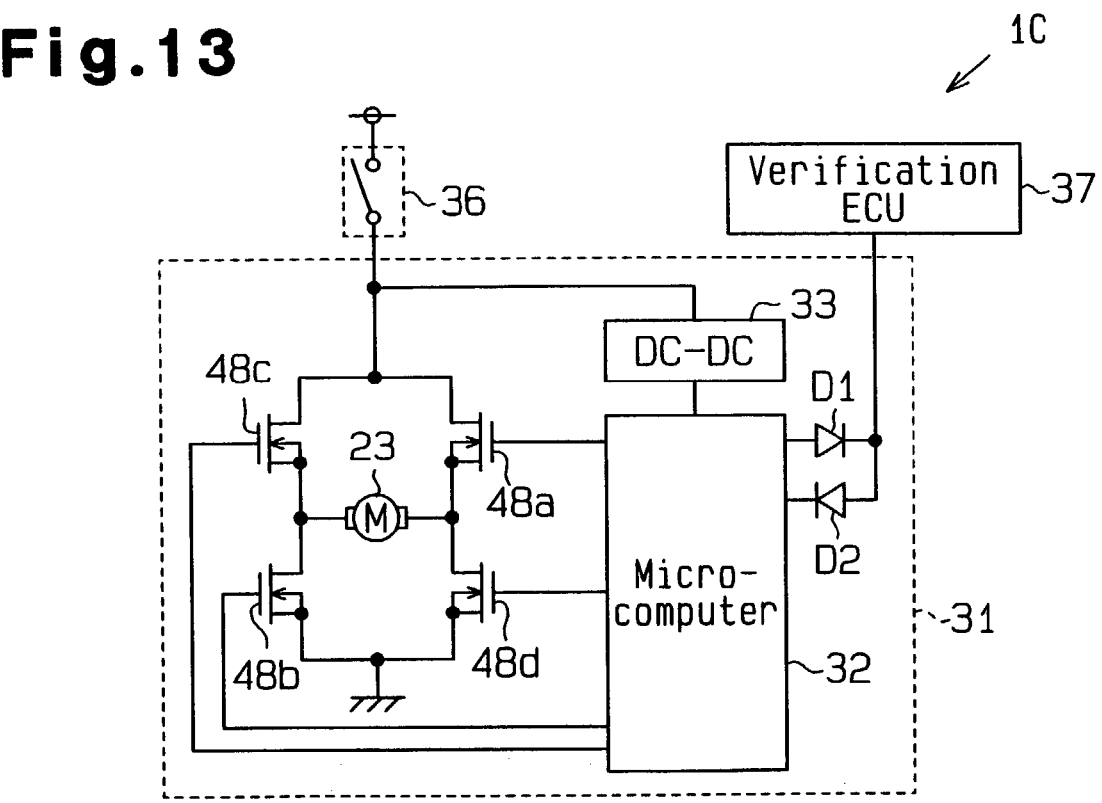

In each of the above embodiments, contactless switching devices, such a power transistor or a power MOSFET, may be used in lieu of the relays 34, 35 as the switching portion. More specifically, for example, in an electronic steering wheel locking device 1C, a switching portion may be configured by a bridge circuit, which uses four n-channel power MOSFETs 48a–48d, as shown in FIG. 13. In this case, the FET 48a and 48b may be activated to rotate the rotary shaft 24 of the motor 23 in the forward direction, and the FET 48c and 48d may be activated to rotate the rotary shaft 24 of the motor in the reverse direction. FIG. 13 shows a modification of the ECU 31 of the first embodiment. However, the ECU 31 of each embodiment may be modified in the same manner.

In the second embodiment, the lock detection switch 38 does not have to be a limit switch and may be any type of contact switch that opens and closes in accordance with the position of the lock pin 21, such as a reed switch.

In the second embodiment, the microcomputer 32 does not have to be provided with a signal for opening and closing the lock detection switch 38.

In each of the above embodiments, the actuator does not have to be the motor 23 and may be any type of mechanism that electrically drives the lock pin 21, such as a solenoid.

The electronic automotive anti-theft device according to the present invention may be, for example, an electronic movement restriction device that restricts the rotation of a wheel with a member corresponding to the lock pin 21 or an electronic shift lever locking device that restricts the shifting of the shift lever with a member corresponding to the lock pin 21.

The present examples and embodiments are to be considered as illustrative and not restrictive, and the invention is not to be limited to the details given herein, but may be modified within the scope and equivalence of the appended claims.

What is claimed is:

1. An electronic automotive anti-theft device comprising:
 a lock pin for engaging and disengaging at least one of a first movable member of a steering mechanism and a second movable member of a driving mechanism in an automobile;
 an actuator for driving the lock pin;

a control unit connected to the actuator to control the actuator;

a power supply line connecting the control unit to a power supply;

a power supply switch connected to the power supply line to supply the control unit with power, wherein the power supply switch disconnects the power supply line when the automobile is being driven or when the automobile is allowed to be driven; and a lock detection switch connected parallel to the power supply switch, wherein the lock detection switch opens when the lock pin is disengaged from the at least one of the first and second movable members and closes when the lock pin is engaged with the at least one of the first and second movable members.

2. The electronic automotive anti-theft device according to claim 1, wherein the automobile includes a shift lever for changing gear positions, and wherein the power supply switch is a contact switch that opens and closes in cooperation with the shift lever.

3. The electronic automotive anti-theft device according to claim 2, wherein the contact switch is either one of a limit switch and a reed switch.

4. The electronic automotive anti-theft device according to claim 1, further comprising:

a detection circuit connected to the lock detection switch and the control unit to generate a lock detection signal that shifts voltage levels in accordance with the opening and closing of the lock detection switch;

wherein the control unit receives the lock detection signal and deactivates the actuator when the lock detection signal shifts voltage levels.

5. The electronic automotive anti-theft device according to claim 1, wherein the lock detection switch is a normally closed type mechanical switch.

6. The electronic automotive anti-theft device according to claim 1, wherein the automobile includes an engine and generates an ignition signal indicating the driving state of the engine, and wherein the power supply switch is a contactless switch that opens and closes in accordance with the ignition signal.

7. The electronic automotive anti-theft device according to claim 6, wherein the contactless switch is a field-effect transistor (FET).

8. The electronic automotive anti-theft device according to claim 1, wherein the first movable member is a steering shaft.

9. An electronic automotive anti-theft device incorporated in an automobile including a shift lever for changing gear positions, wherein the gear positions include a parking position, the electronic automotive anti-theft device comprising:

a lock pin for engaging and disengaging at least one of a first movable member of a steering mechanism and a second movable member of a driving mechanism in an automobile;

an actuator for driving the lock pin;

a control unit connected to the actuator to control the actuator;

a power supply line connecting the control unit to a power supply;

a power supply switch connected to a power supply line to supply the control unit with power, wherein the power supply switch closes and supplies the control unit with power when the shift lever is located at the parking position, and the power supply switch opens and stops supplying the control unit with power when the shift lever is not located at the parking position; and a lock detection switch connected parallel to the power supply switch, wherein the lock detection switch closes and supplies the control unit with power when the lock pin is engaged with the at least one of the first and second movable members, and wherein the lock detection switch opens and stops supplying the control unit with power when the lock pin is disengaged from the at least one of the first and second movable members.

* * * * *